United States Patent [19]
Lee

[11] Patent Number: 6,122,818
[45] Date of Patent: Sep. 26, 2000

[54] OPTIMAL WIRING CONFIGURATION FOR MAGNETIC RECORDING ELEMENTS

[75] Inventor: Rodney Lee, San Jose, Calif.

[73] Assignee: Headway Technologies, Inc., Milpitas, Calif.

[21] Appl. No.: 09/408,493

[22] Filed: Sep. 30, 1999

[51] Int. Cl.[7] ........................................... G11B 5/31
[52] U.S. Cl. ............................................ 29/603.12
[58] Field of Search ................ 360/103, 234.5; 29/603.1–603.27

[56] References Cited

U.S. PATENT DOCUMENTS 4,759,118   7/1988   Nakashima ................. 29/603

*Primary Examiner*—Robert S. Tupper
*Attorney, Agent, or Firm*—George O. Saile; Stephen B. Ackerman

[57] ABSTRACT

Disclosed are methods of allowing the current direction through the sensor or coil of a magneto resistive (MR) read/inductive write head to be consistent with the orienting magnetic field of the sensor or coil by allowing the current direction to be switched by a single mask layer change. This goal is achieved by creating additional connection sites to the non-magnetic mask layer to provide alternative means of connecting element leads to bonding pads and thus providing a choice in which direction to route the current through the sensor or coil of the read/write head.

20 Claims, 3 Drawing Sheets

OPTIMAL WIRING CONFIGURATION FOR MAGNETIC RECORDING ELEMENTS

BACKGROUND OF THE INVENTION

1. Field of the Invention

The invention relates to the current flow in Magnetic Recording Elements, and more particularly to methods of switching the current direction of a Soft Adjacent Layer Magneto Resistive head (SAL) or a Single Stripe Magneto Resistive head (SSMR).

2. Description of the Related Art

In the present Soft Adjacent Layer Magneto Resistive head (SAL) or the Single Stripe Magneto Resistive head (SSMR), the current direction through the sensor needs to be consistent with the orienting magnetic field of the sensor. Because the electronics and wiring requirements of individual file (magnetic disk storage) manufacturers are not standardized, the pad polarity designations on the slider are not always compatible with the current direction required in the device for magnetic requirements.

U.S. Patents which relate to read and/or write heads are listed below:

U.S. Pat. No. 5,757,585 (Aoyagi et al.) show a method for forming bonding leads to a slider and head.

U.S. Pat. No. 5,739,982 (Arya et al.) discloses an improved slider-suspension electrical interconnection assembly.

U.S. Pat. No. 5,563,753 (Mowry et al.) shows a contact scheme for minimizing inductive pickup in magneto restrictive (MR) read heads.

U.S. Pat. No. 5,530,604 (Pattanaik) presents a process that forms solder bumps to contact to a thin film transducer.

U.S. Pat. No. 5,486,968 (Lee et al.) describes a planarization method which shows the conventional coil and sensor wiring patterns.

U.S. Pat. No. 5,465,186 (Bajorek et al.) teaches a method for shorting the MR head leads for ESD protection during manufacturing.

None of the cited related art suggest a single mask layer modification as a solution to the above listed problem. The proposed invention, detailed subsequently, allows the current direction to be switched by a single mask layer change, rather than redesigning all the layers relating to the magneto restrictive sensor leads. As different wiring requirements are requested, the current direction through the sensor can remain in the same relationship to the orienting field of the sensor by one mask layer modification.

SUMMARY OF THE INVENTION

It is an object of the present invention to provide a method of allowing the current direction through the sensor or coil of a magneto resistive (MR) read/inductive write head to be consistent with the orienting magnetic field of the sensor or coil.

Another object of the present invention is to allow the current direction to be switched by a single mask layer change.

A further object of the present invention is to use a nonmagnetic material to form the wiring of the masking layer.

These objects have been achieved by constructing an additional connection site for the masking layer which connects the bonding pad to the element leads, thus providing a choice in which direction to route the current through the sensor or coil of the read/write head.

DESCRIPTION OF THE PREFERRED EMBODIMENT

The present invention allows freedom to personalize the wiring pad designations as required by the Hard Disk Drive manufacturers while maintaining magnetic integrity of the sensor/coil of the read/write head. This preferred embodiment of the present invention can be used in all single stripe magneto resistive (SSMR), soft-adjacent layer magneto resistive (SAL) and giant magneto resistive (GMR) type devices.

Figure 1:
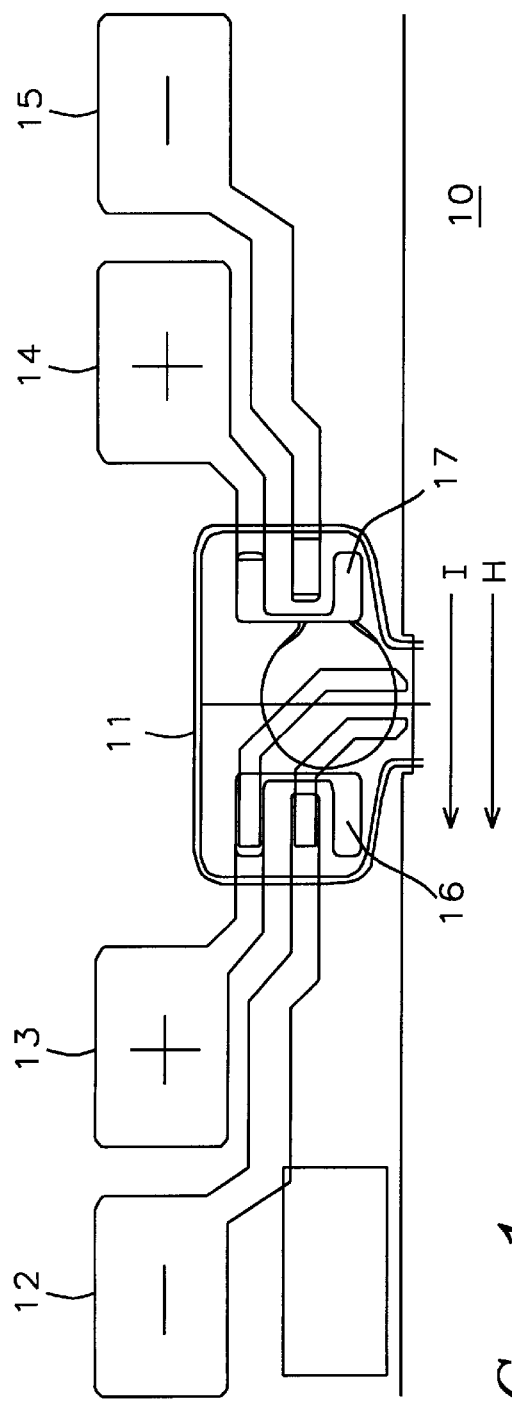
FIG. 1 is an overall view of a read/write head of the present invention showing the direction of current flowing in the sensor (read head).
Figure 2:
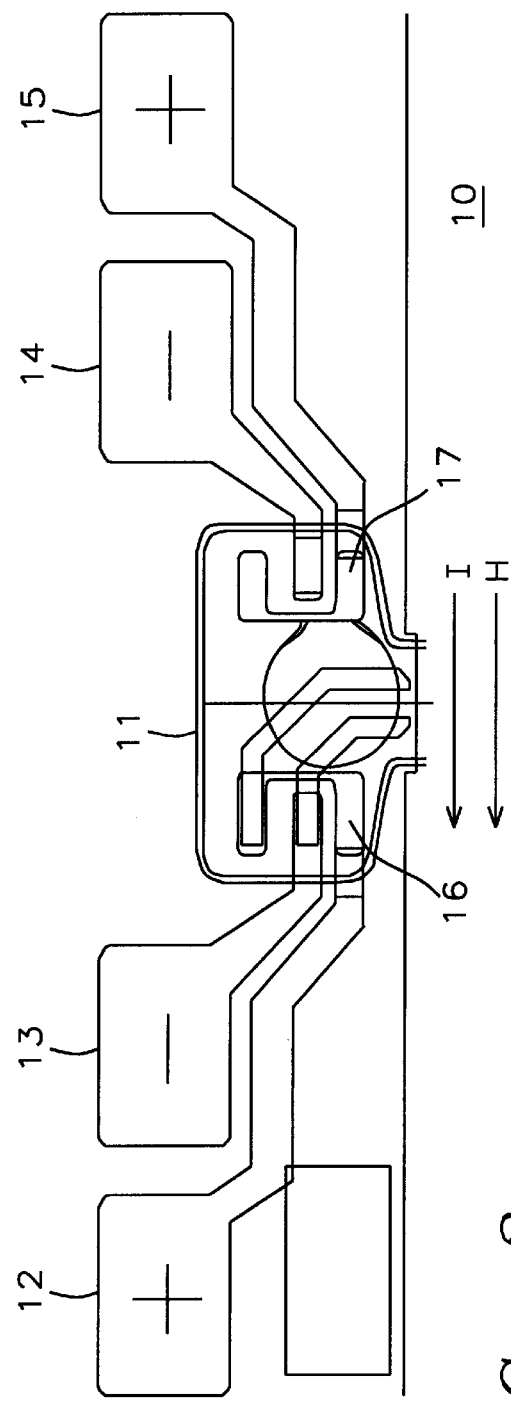
FIG. 2 is an overall view of a read/write head of the present invention showing current in the sensor (read head) flowing in the same direction as in FIG. 1, while the direction of current in the wiring pad is in the opposite direction.

FIG. 1 is an overall view of the method of the present invention, depicting a read/write head assembly 10 with read/write head 11, bonding pads 12, 13 for the read sensor and bonding pads 14, 15 for the write coil. Also shown are a masking layer with patterns 16 and 17 with their additional connection sites for the read sensor and write coil, respectively. The current direction through the sensor is indicated by the arrow labeled I, the direction of the magnetic field is indicated by the arrow labeled H. FIG. 2 is similar to FIG. 1 in the general arrangement of the components except that bonding pads 12, 13, 14, and 15 are connected differently to the masking layers. Bonding pads 12 and 15 in particular are connected to the additional connection sites of the masking layers 16 and 17. Though currents for both the read sensor and the write coil are reversed, the direction of arrows I and H have not changed.

Figure 3A:
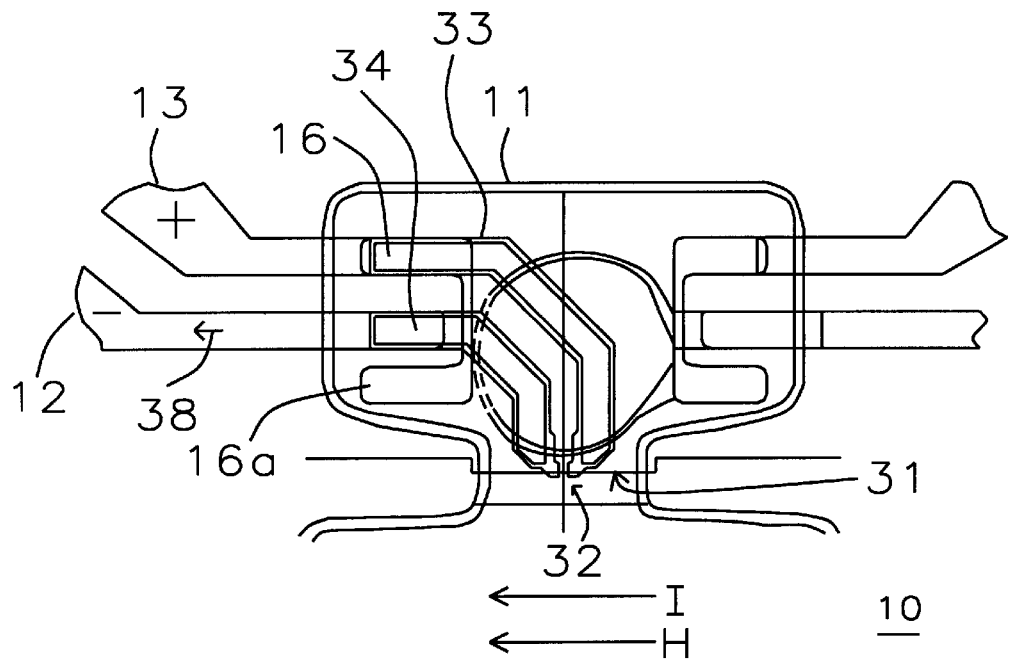
FIG. 3a is a detailed view of the read/write head of FIG. 1 showing the direction of current flowing in the sensor (read head) and the additional connection site.
Figure 3B:
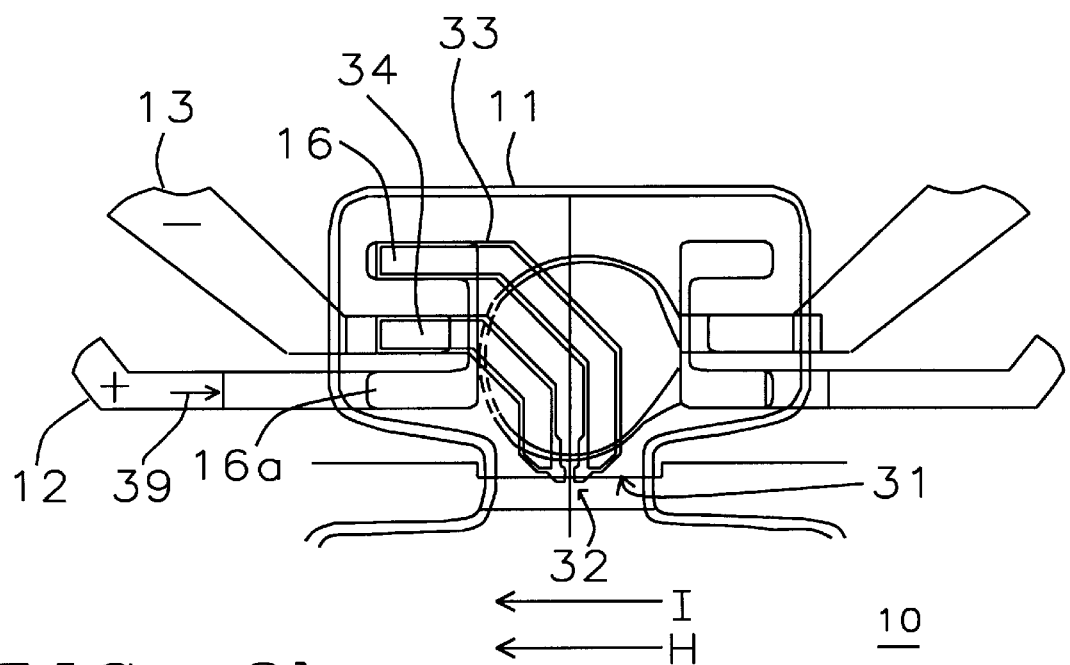
FIG. 3b is a detailed view of the read/write head of FIG. 2 showing the reversal of the current through the use of the additional connection site for the read head.

We now describe the preferred method of the present invention in greater detail by referring to FIG. 3a and FIG. 3b. In all the figures, like parts are identified by like numerals. Read/write head assembly 10 consists of read/write head 11, air bearing surface 31, and magneto restrictive sensor 32. Sensor 32 terminates in element leads 33 and 34. Masking layer 16 connects to element lead 33; masking layer 16 also has an additional connecting site 16a. Read bonding pad 12 is shown connected to element lead 34 in FIG. 3a and to the additional connecting site 16a in FIG. 3b. Similarly, read bonding pad 13 is shown connected masking layer 16 in FIG. 3a and to the to element lead 34 in FIG. 3b. This arrangement allows current (arrow I) and the magnetic field (arrow H) to line up regardless of the fact that current from bonding pad to 12 is negative in FIG. 3a and is positive in FIG. 3b, as indicated by arrows 38 and 39.

Figure 4A:
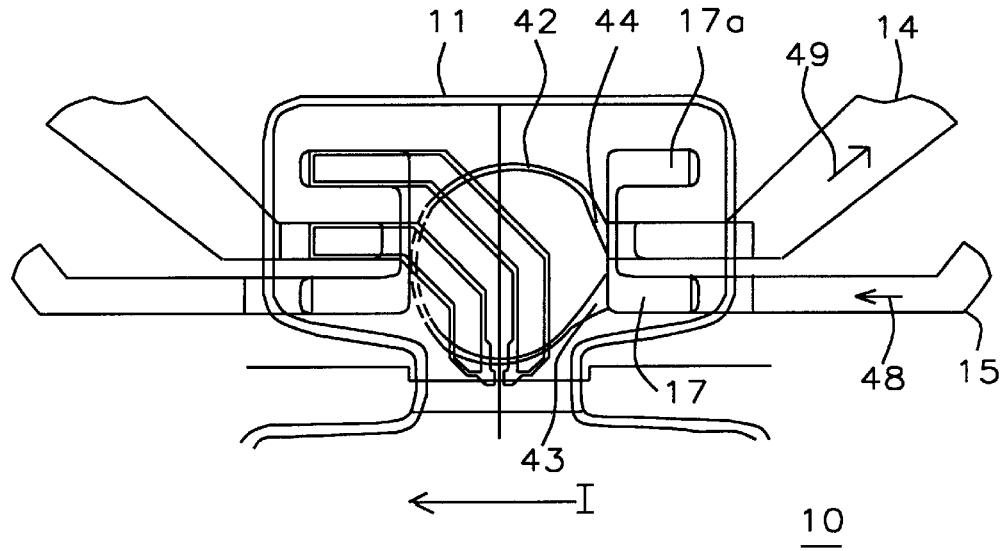
FIG. 4a is a detailed view of the read/write head similar to FIG. 3b showing the direction of current flowing in the coil (write head) and the additional connection site.
Figure 4B:
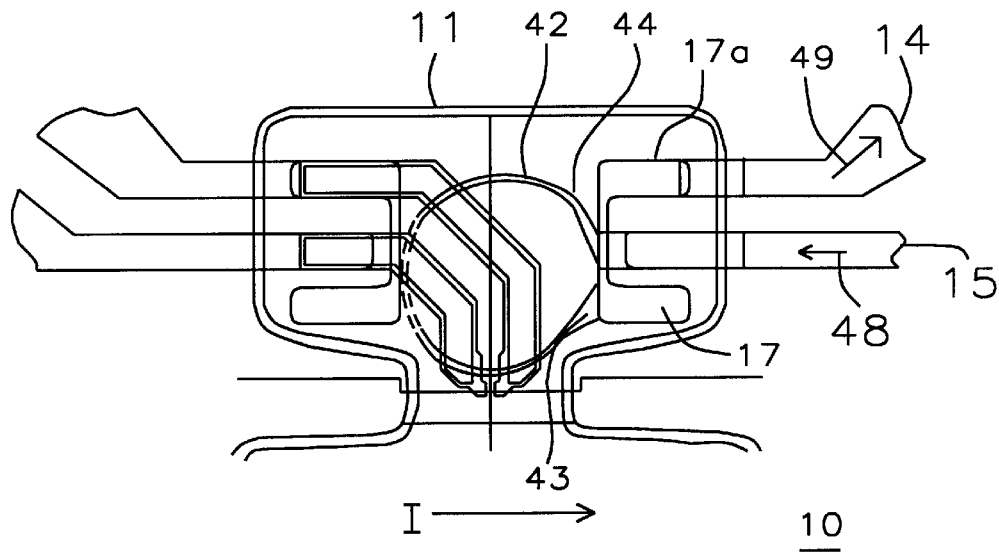
FIG. 4b is a detailed view similar to FIG. 3a showing the reversal of the current through the use of the additional connection site for the write head.

FIG. 4a and FIG. 4b show an analogous arrangement for the write coil. Multi-turn Coil 42 terminates in element leads 43 and 44. Masking layer 17 connects to element lead 43; masking layer 17 also has an additional connecting site 17a. The additional connecting sites 16a (above and FIGS. 3a and 3b) and 17a act thus as cross-overs and thereby allow the current reversal to the read/write head. Write bonding pad 14 is shown connected to element lead 44 in FIG. 3a and to the additional connecting site 17a in FIG. 4b. Similarly, write bonding pad 15 is shown connected masking layer 17 in FIG. 4a and to the to element lead 44 in FIG. 4b. This arrangement allows current through the coil (arrow I) to switch direction even though the current in bonding pads 14 and 15 has the same polarity as indicated by arrows 48 and 49. Similarly, current through coil 42 could have the same direction as in FIG. 4a by changing the current polarity in bonding pads 14 and 15.

The method of reversing current direction of a magnetic read/write head assembly 10 comprises the following steps:

1) providing a slider (not shown) to support the magnetic read/write head 11.

2) providing bonding pads 12, 13, 14, 15 on the slider.

3) providing first and second read element leads 33, 34 for magneto resistive sensor 32 of read/write head 11.

4) providing first and second write element leads 43, 44 for write coil 42 of read/write head 11.

5) providing a non-magnetic mask layer with patterns 16 and 17 to connect the element leads to the bonding pads.

The additional connection sites of the non-magnetic mask layer allow the current direction to be reversed through a) the magneto resistive sensor of the read head, and b) the coil of the write head. The current direction through the magneto resistive sensor of the read head and through the coil of the write head can be reversed with one non-magnetic mask layer change.

While the invention has been particularly shown and described with reference to the preferred embodiments thereof, it will be understood by those skilled in the art that various changes in form and details may be made without departing from the spirit and scope of the invention.

What is claimed is:

1. A method of switching current direction of a magnetic read/write head, comprising the steps of:

providing a slider to support said magnetic read/write head;

providing bonding pads on said slider;

providing element leads for a magneto resistive sensor of said magnetic read/write head;

providing element leads for a write coil of said magnetic read/write head; and providing a non-magnetic mask layer to connect said element leads to said bonding pads.

2. The method of claim 1, wherein said non-magnetic mask layer provides an additional connection site each for said magneto resistive sensor and said write coil to provide alternative means of connecting said element leads to said bonding pads.

3. The method of claim 2, wherein said additional connection site for said sensor allows the current direction through said sensor to be reversed.

4. The method of claim 1, wherein the current direction through said sensor can be reversed with one non-magnetic mask layer change.

5. The method of claim 2, wherein said additional connection site for said coil allows the current direction through said coil to be reversed.

6. The method of claim 5, wherein the current direction through said coil can be reversed with one non-magnetic mask layer change.

7. A method of switching current direction of a magnetic read head, comprising the steps of:

providing a slider to support said magnetic read head;

providing a first and a second read bonding pad on said slider;

providing a first and a second read element lead for a magneto resistive sensor of said magnetic read head;

providing a non-magnetic read mask layer with a first and a second connection site; and connecting said first read element lead to said first connection site of said non-magnetic read mask layer.

8. The method of claim 7, wherein said first connection site of said non-magnetic read mask layer connects to said first read bonding pad.

9. The method of claim 7, wherein said second read element lead connects to said second read bonding pad.

10. The method of claim 7, wherein said second read element lead connects to said first read bonding pad.

11. The method of claim 7, wherein said second connection of said non-magnetic read mask layer connects to said second read bonding pad.

12. The method of claim 7, wherein said second connection site of said non-magnetic read mask layer allows the current direction through said read head to be reversed.

13. The method of claim 7, wherein the current direction through said magneto resistive sensor of said read head can be reversed with one non-magnetic read mask layer change.

14. A method of switching current direction of a magnetic write head, comprising the steps of:

providing a slider to support said magnetic write head;

providing a first and a second write bonding pad on said slider;

providing a first and a second write element lead for a coil of said magnetic write head;

providing a non-magnetic write mask layer with a first and a second connection site; and connecting said first write element lead to said first connection site of said non-magnetic write mask layer.

15. The method of claim 14, wherein said first connection site of said non-magnetic write mask layer connects to said first write bonding pad.

16. The method of claim 14, wherein said second read element lead connects to said second read bonding pad.

17. The method of claim 14, wherein, in the alternative, said second write element lead connects to said first write bonding pad.

18. The method of claim 14, wherein, in the alternative, said second connection of said non-magnetic write mask layer connects to said second write bonding pad.

19. The method of claim 14, wherein said second connection site of said non-magnetic write mask layer allows the current direction through said coil to be reversed.

20. The method of claim 14, wherein the current direction through said coil of said write head can be reversed with one non-magnetic write mask layer change.

* * * * *